United States Patent [19]

Cairns et al.

[11] Patent Number: 4,819,320
[45] Date of Patent: Apr. 11, 1989

[54] AUTOMATIC DRILL BIT CHANGE APPARATUS FOR ROBOT DRILLING

[75] Inventors: Royston H. Cairns; John R. Thompson, both of Preston, England

[73] Assignee: British Aerospace Public Limited Company, London, England

[21] Appl. No.: 111,079

[22] Filed: Oct. 19, 1987

Related U.S. Application Data

[63] Continuation of Ser. No. 793,761, Nov. 1, 1985, abandoned.

[30] Foreign Application Priority Data

Nov. 3, 1984 [GB] United Kingdom ............... 8427853

[51] Int. Cl.⁴ ............................................. B23Q 3/157
[52] U.S. Cl. ..................................... 29/568; 29/26 A; 408/240; 409/232
[58] Field of Search ................. 29/26 A, 568; 408/239 R, 239 A, 240; 409/232, 234

[56] References Cited

U.S. PATENT DOCUMENTS

| Re. 26,827 | 3/1970 | Swanson et al. | 29/568 X |
| 4,412,766 | 11/1983 | Eckstein | 409/233 |
| 4,419,807 | 12/1983 | Moulin | 29/568 |

Primary Examiner—Z. R. Bilinsky
Attorney, Agent, or Firm—Cushman, Darby & Cushman

[57] ABSTRACT

Where components are drilled by means of a robot a problem occurs when different size holes are needed to be drilled. The existing solution to this problem is to provide a drill unit (including drill bit, chuck and feed device) for each size of hole to be drilled and programme the robot to select the appropriate drill unit from the series of drill units supplied, perform its task, replace the drill unit in its store and select a further drill unit. Thus a complete drill unit is changed for every change in hole size. The presently described arrangement provides means to effect only drill bit change, the chuck and feed unit remaining on the robot at all times. The arrangement also provides means to effect such drill bit change while the chuck is rotating thereby obviating the need to stop and restart every time the drill bit is changed.

7 Claims, 7 Drawing Sheets

AUTOMATIC DRILL BIT CHANGE APPARATUS FOR ROBOT DRILLING

This is a continuation of application Ser. No. 793,761, filed Nov. 1, 1985, which was abandoned upon the filing hereof.

The drilling of components by means of robots has become increasingly more feasible to the improved accuracy and repeatability of the robots. Basically a robot has an arm which carries a drill unit comprising a drill bit assembly, a chuck to hold the drill bit assembly, and a motor to effect rotation of the chuck and the drill bit assembly held therein. The robot arm is programmed to move the drill unit from a storage position to hole drilling position or positions and back again. Feed motion of the drill (that is to say along its axis) is either provided by movement of the arm or a feed device associated with the drill unit which moves the drill unit with respect to the arm. A problem with known robotic drilling arrangements exists when holes of different diameters are to be formed and/or where different materials are to be drilled which naturally require drill bits of different diameters and/or different material and cutting edge formation.

The known solution to this problem has been to provide a separate drill unit for each task, each drill unit incorporating a drill bit of the required diameter, material or cutting edge formation. A bank of such drill units is provided at the storage position, each drill unit awaiting selection by the robot arm and subsequent transfer to the drilling position to perform an appointed drilling task.

There are certain disadvantages associated with this solution namely:
1. The space available in the cell in which the robot is situated is limited and thus a bank of drill units, which may be pneumatically powered, will take up precious space, reducing that available for other tools requiring to be handled by the robot.
2. There are weight variations between different drill units and these differences tend to alter the robot arm position and hence drill position accuracy is reduced.
3. There is an adverse time factor of up to 45 seconds each time a drill unit is coupled or uncoupled to the robot arm due to the complexity of the connections for compressed air and electrical services to the drill unit.
4. The cost of providing such a bank of drill units and their associated change system makes the solution economically undesirable.

An object of the present invention is to overcome these disadvantages by means of apparatus which allows merely the drill bit assembly portion of the drill unit to be changed whilst the remainder of the drill unit, namely at least the motor and the chuck, remains connected to the robot arm.

According to the present invention, apparatus for automatically effecting drill bit assembly change in a drill unit carried by robot means, the drill unit including chuck means rotatable about an axis of rotation for accepting, holding and releasing a drill bit assembly, the chuck means having relatively movable means for effecting a chuck open condition in which the drill bit assembly can be accepted and released, and for effecting a chuck closed condition in which the drill bit assembly can be held, the apparatus characterised by including a drill bit assembly storage unit having holding means for holding a drill bit assembly in an attitude for acceptance by a chuck means positioned with respect to the storage unit by the robot, urging means for axially urging the holding means from a storage position to a position in which the drill bit assembly is presented to the chuck means, chuck engagement means positioned to effect sequential opening and closing of the chuck means, and sequencing means responsive to the position of the chuck means to effect urging of the drill bit assembly into the chuck means in correct sequence.

One preferred embodiment of apparatus for automatically effecting drill bit assembly change in a drill unit carried by robot means is described by way of example with reference to the accompanying drawings in which.

Figure 1:
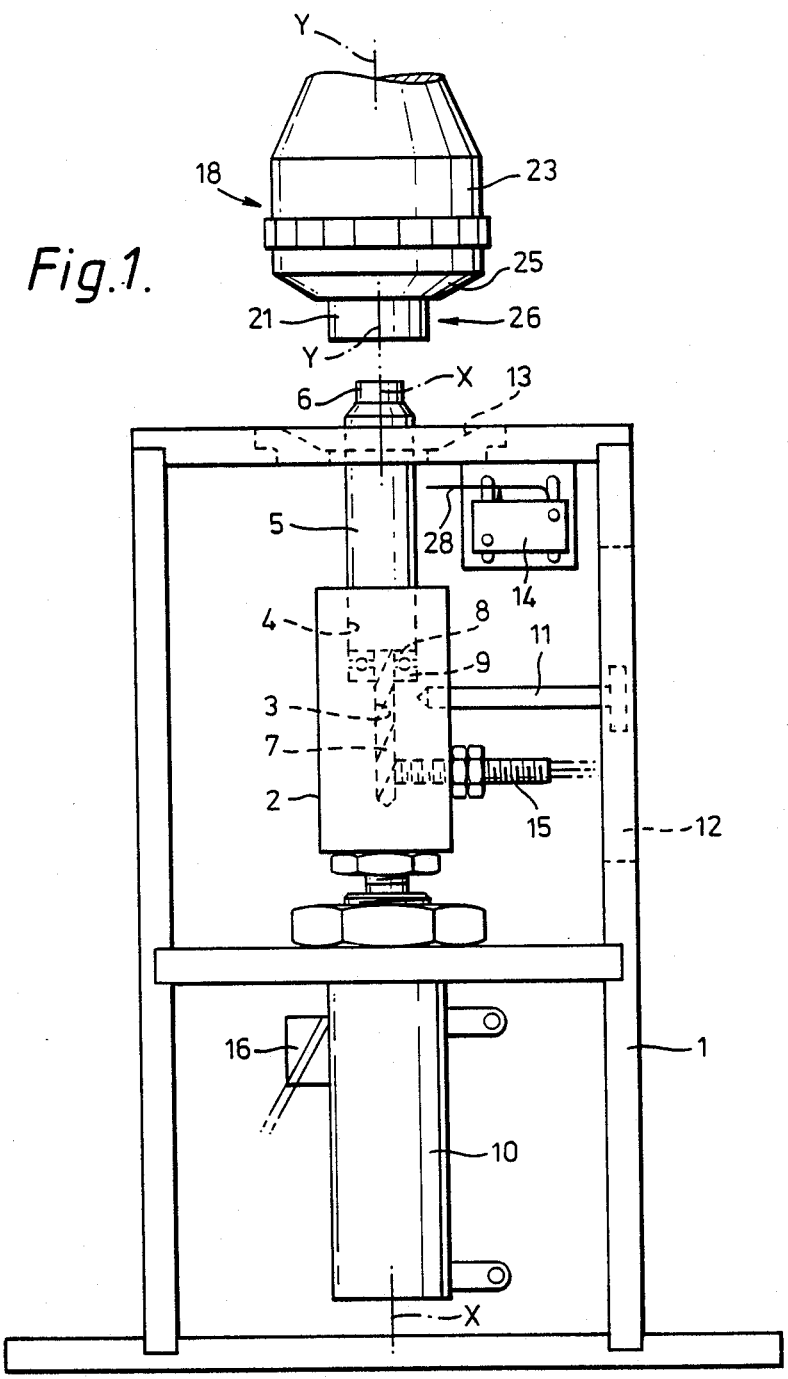
FIG. 1 is a general arrangement drawing of the apparatus.

In FIG. 1, a single drill bit assembly storage unit is illustrated. Naturally, a plurality of such storage units is located within reach of the robot with which the storage units are associated. Each storage unit comprises a framework 1 carrying, on a vertical axis X—X, a drill bit assembly locating device or holder 2 which has twin cylindrical bores co-axial with the axis X—X, that bore referenced 3 being of such a diameter to produce clearance for a drill bit portion of a drill bit assembly, and that bore referenced 4 being of such a diameter to accept and locate a standard shank portion of a drill bit assembly.

Each drill bit assembly comprises a standard shank portion 5 of generally cylindrical form with a tang 6 at its upper end, the whole being adapted to be engaged and gripped by a chuck of generally known design to be later described with reference to FIG. 8. The shank portion has protruding from it, a drill bit portion 7 and at the junction between the two, provides an annular shoulder 8, which when the drill bit assembly is fully accepted by the holder 2 for storage engages an annular thrust bearing 9 formed at the junction between the small and larger bores 3 and 4.

The holder 2 is moved bodily axially along the axis X—X by means of a pneumatic ram 10, the control of which will be described below. The holder 2 is prevented from rotating by means of a radially extending arm 11 engaging in a slot 12 formed in the framework 1.

Above the holder 2, the framework 1 provides a mounting for an annular concave conical bush 13 which provides an abutment for the chuck means to be described. The drill bit assembly passes through this bush which is co-axially mounted on axis X—X. The aperture within the bush is of such a diameter to allow part of the chuck to extend therethrough as later described.

Figure 2:
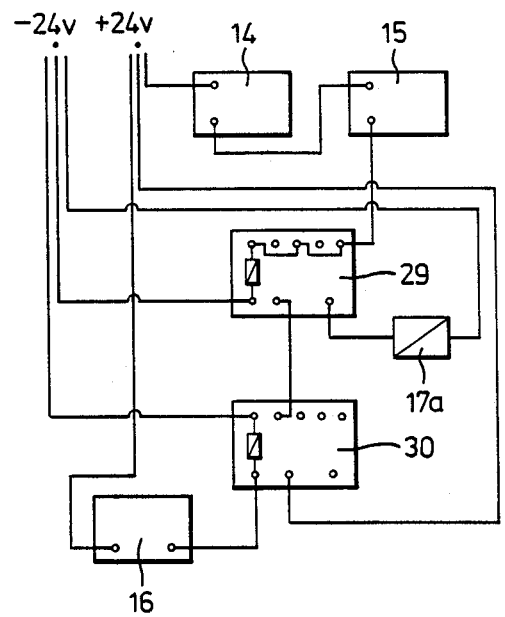
FIGS. 2 and 3 are diagrams of suitable sequencing means.
Figure 3:
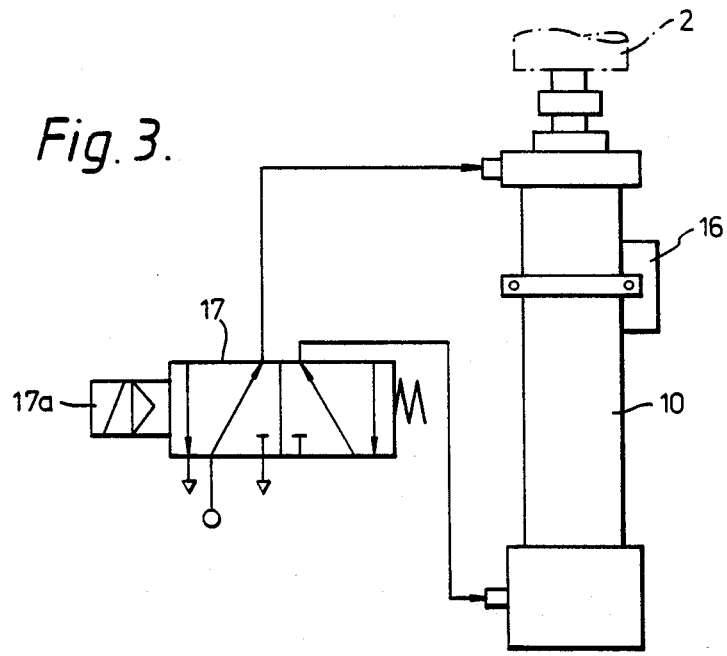

The framework 1 carries a microswitch 14 adjacent but below the bush 13, the holder 2 carries a proximity switch 15, and the ram 10 carries a proximity switch 16 and a pneumatic valve 17 operated by a solenoid 17a (FIGS. 2 and 3).

A suitable chuck (namely an Archer quick change model No. 1102) for use with the apparatus is shown at 18. This chuck is of generally known design and is illustrated in more detail in FIG. 8. It is part of a drill unit, not shown, but also of generally well known design, carried by the arm of a robot. The drill unit comprises, in addition to the chuck a motor to rotate the chuck about its axis Y—Y (which, as shown in the FIGS. 1,4,5,6, and 7, lies co-axial with the axis X—X during the drill bit assembly change but subsequent to such change may be in any attitude selected by the robot arm to perform the drilling task), and also a feed mechanism to urge the chuck, and hence its drill bit, along its axis Y—Y. Naturally, if so designed the robot arm itself can provide the feed movement along axis Y—Y, thus rendering the feed mechanism unnecessary.

Figure 8:
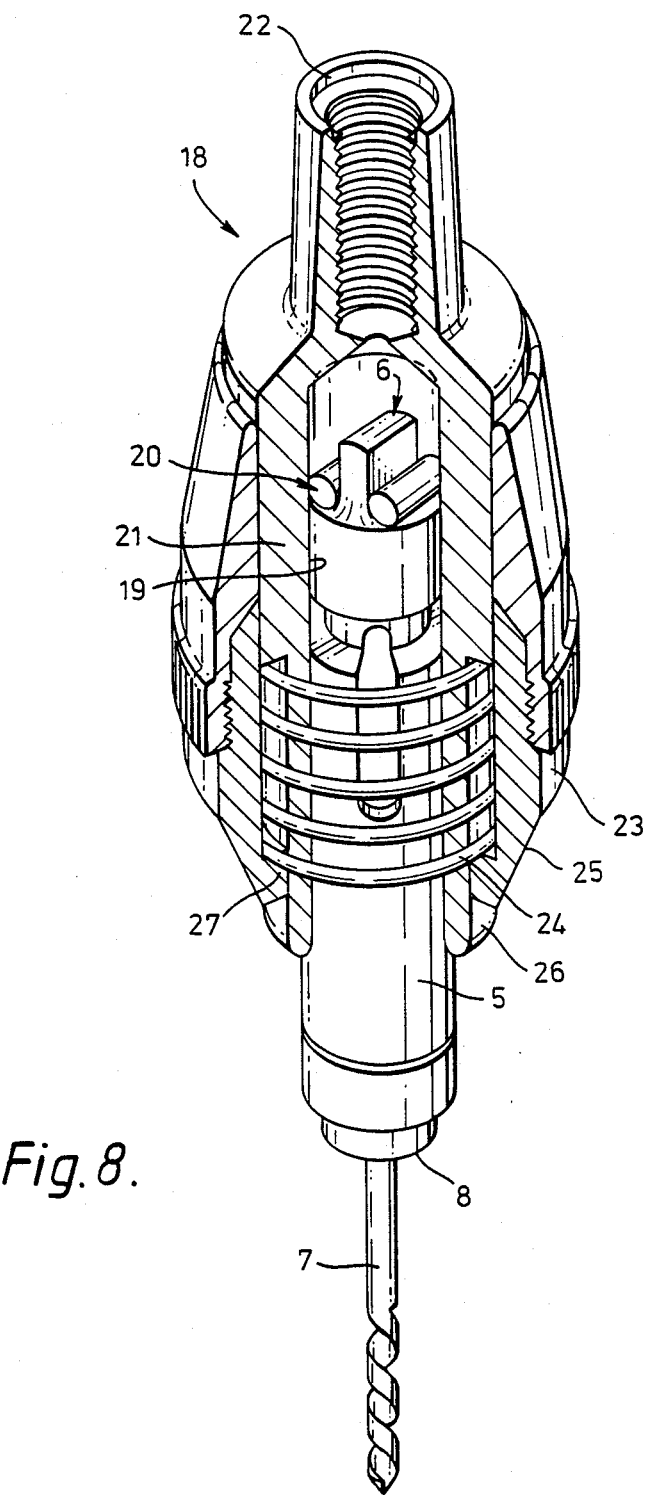
FIG. 8 is a perspective view, partly in section, of a conventional chuck for use with apparatus embodying this invention.

In FIG. 8, the chuck 18 is shown to have a generally cylindrical inner bore 19 to accept a standard shank 5 of a drill bit assembly. Naturally the shanks 5 of each drill bit assembly to be used by the robot are the same. Only the drill bits themselves vary accordingly to the size of hole and/or the task they have to perform. The tang 6 engages with members 20 located in the bore which ensures positive transmission of rotation between chuck and drill bit assembly.

The bore 19 is formed within an inner sleeve 21 of the chuck which at its upper end 22 as drawn, is adapted to be carried by the other parts of the drill unit such as the motor or the feed mechanism if fitted. The inner sleeve 21 protrudes through an outer sleeve 23 at both ends. The outer sleeve is axially movable with reference to the inner sleeve to effect a chuck open condition (when the outer sleeve is moved relatively upwards as drawn) and to effect a chuck closed condition (as illustrated). In the former the drill bit assembly can be inserted and removed, the the latter it is held in a drilling position. The inner and outer sleeves 21 and 23 are biased toward the closed position by a coil spring 24.

The outer sleeve 23 has a chamfered region 25 which engages the mating region of the bush 13 on the framework 1.

In a suitable design of chuck, the lower annular region 26 of the inner sleeve 21 is formed of resilient fingers which spring outwards to release an inserted shank 5 when in the sleeves 21 and 23 are in the "chuck open" axial position and are urged inwards to grip an inserted shank 5 by means of a mating internal annular region 27 when the sleeves 21 and 23 are in the "chuck closed" position illustrated in FIG. 8.

Figure 4:
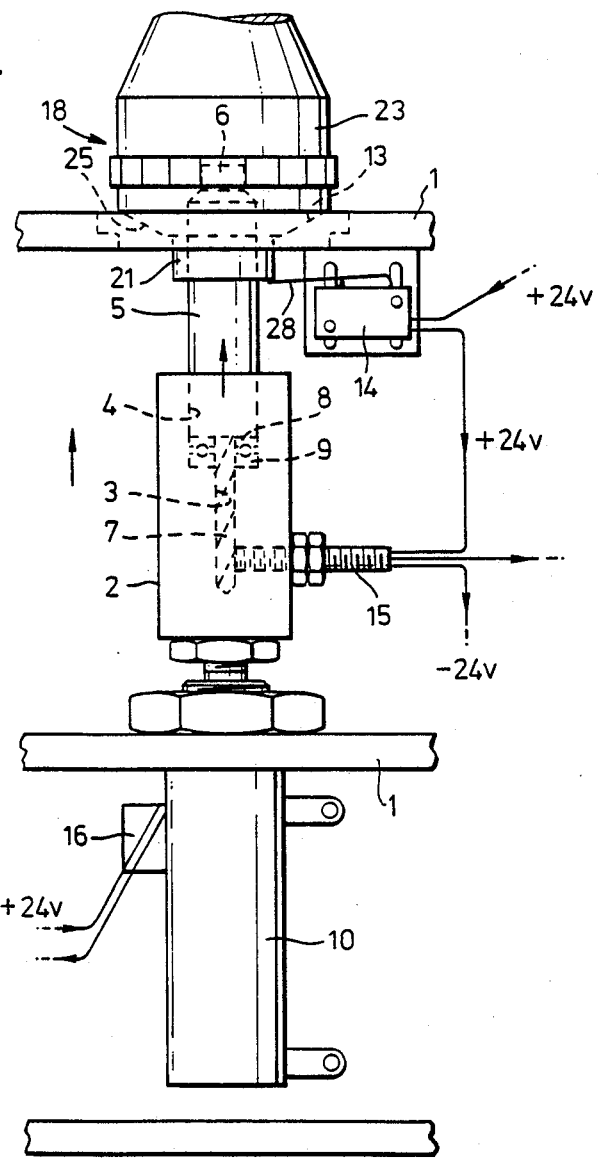
FIGS. 4 to 6 illustrate sequential stages of drill bit assembly pick up by chuck means.
Figure 5:
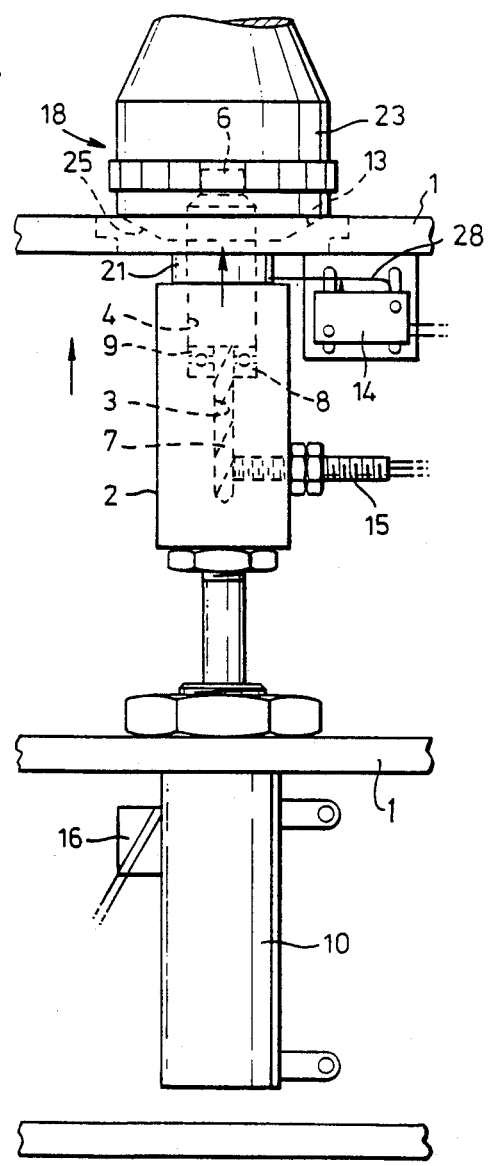
Figure 6:
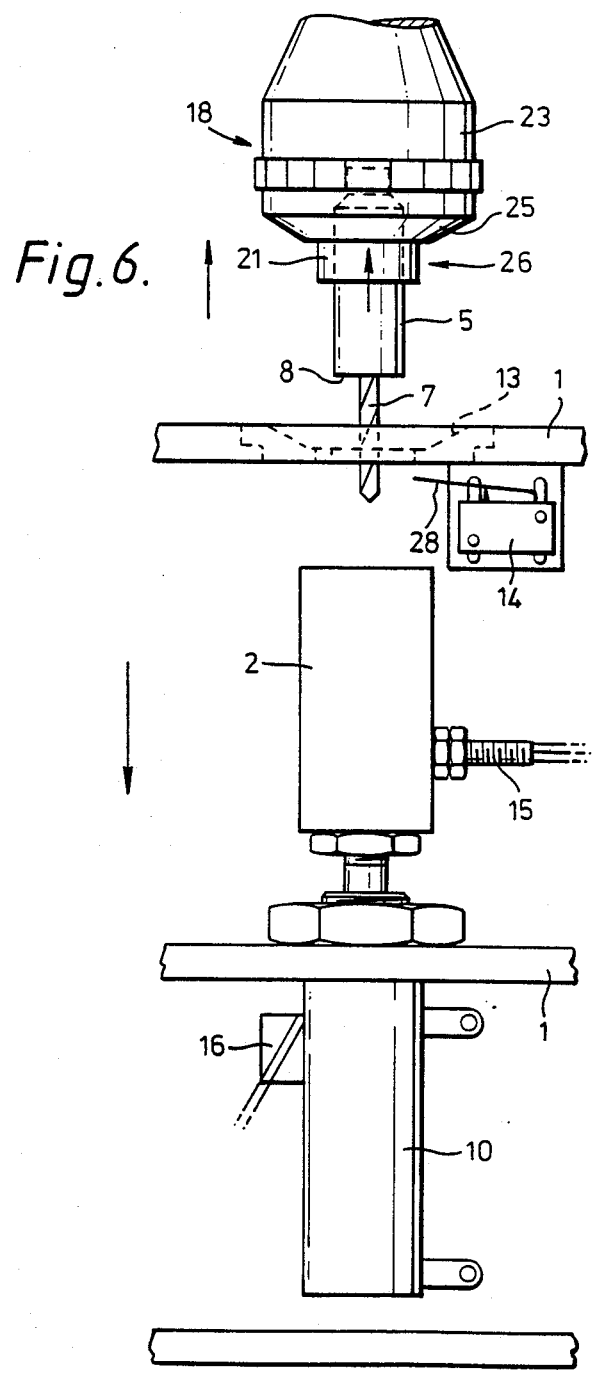

Referring now to FIGS. 4 to 6, the apparatus functions sequentially to pick-up a drill bit assembly 5,7 from its holder 2 as follows. During this description reference is also made to FIGS. 2 and 3 which jointly illustrate an electrical and pneumatic sequencing arrangement to ensure correct pick-up.

The robot is programmed to position the chuck with its axis Y—Y co-axial with the axis X—X of the holder 2 which has already stored within it, the appropriate drill bit assembly 5,7 for the task to be performed. The holder 2 is in its lowest position with the ram 10 retracted; nevertheless the shank 5 protrudes through the hole in the bush 13. The drill bit assembly 5,7 rests upon the thrust bearing 9 in the holder 2 and although initially stationary it can thus be freely rotated whilst still in its holder.

The chuck 18 is moved towards the holder 2 so that its outer sleeve 23 mates with the bush 13 and is prevented from further movement. Movement of the inner sleeve 21 continues however, so that it extends through the bush 13 towards the holder 2 and since this relative movement of the sleeves 21 and 23 opens the chuck, the shank can enter the bore 19.

Movement of the chuck towards the holder 2 is effected by using robot motion or, preferably, by using the feed mechanism of the drill unit previously described if that mechanism is fitted.

Movement of the inner sleeve 21 towards the holder 2 causes the inner sleeve 21 to contact an arm 28 of the microswitch 14 which allows a 24v signal from the robot to pass to the proximity switch 15 which assuming a drill bit assembly is present passes the signal via a double relay 29 to the solenoid operated valve 17 controlling the ram 10. This allows compressed air to extend the ram 10 and thus urge the holder 2 and its carried drill bit assembly towards the open chuck—see FIG. 5—until the tang region 6 of the drill bit assembly is adjacent to the members 20 of the chuck. If the chuck is rotating, and it is preferable that it does to save acceleration and deceleration time, the drill bit assembly 5,7 now rotates with it.

At this point the proximity switch 16 senses the approach of the piston of the ram 10 and signals the robot to withdraw the chuck from the position of FIGS. 4 and 5 to that of FIG. 6. In doing so the chuck adopts its closed condition gripping the shank 5. To ensure that the shank 5 is held in the chuck until properly gripped the ram stroke is arranged to ensure that the holder 2 nudges the base of the chuck until a further signal sent via relay 30 de-energises the solenoid 17a of the valve 17. The solenoid 17a is arranged to remain energised until this happens despite the chuck movement breaking the microswitch 14. On de-energisation of the solenoid 17a, the pneumatic valve causes the ram 10 to contract to its storage position shown in FIG. 6 whilst the chuck moves away with the drill bit assembly safely engaged.

Figure 7:
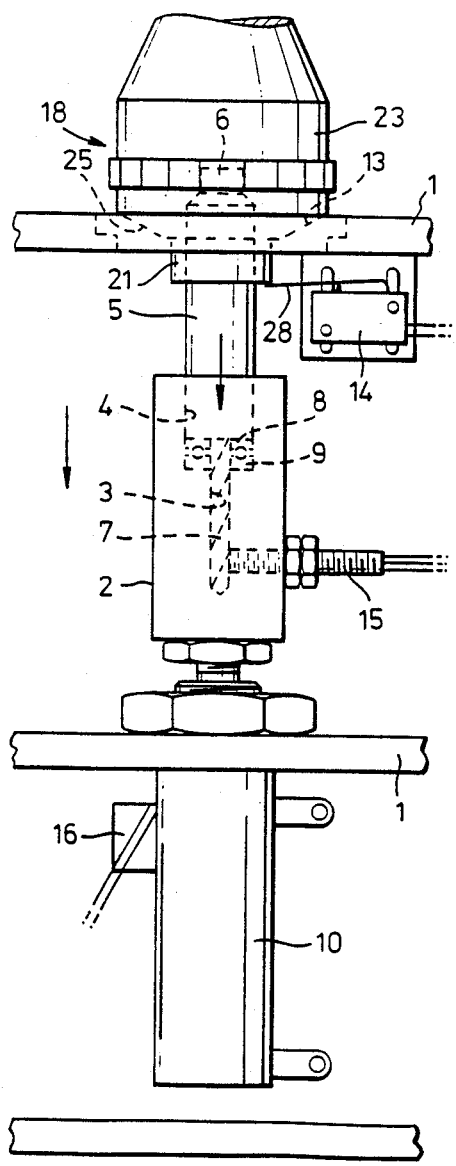
FIG. 7 illustrates a partly sectioned view of suitable chuck means with a drill bit assembly located therein.

FIG. 7 illustrates the drill bit assembly put down stage. With the holder 2 in its storage position illustrated in FIG. 7, the robot positions the chuck 18 with its axis Y—Y coincident with the axis X—X. The chuck is urged so that its outer sleeve 23 engages the bush 13 and the inner sleeve 21 is continued to be urged towards the holder 2, thereby opening the chuck so that the drill bit assembly 5,7 can drop out to be received by the holder 2 lying directly below. The proximity switch 15 senses the presence of the drill bit 7 and signals the robot to move the chuck to its next position.

The chuck may continue to rotate during the put down stage.

We claim:

1. Apparatus for automatically effecting drill bit assembly change in a drill unit carried by robot means, the drill unit including chuck means rotatable about an axis of rotation for accepting, holding, and releasing a drill bit assembly, the chuck means having relatively movable means for effecting a chuck open condition in which the drill bit assembly can be accepted and released, and for effecting a chuck closed condition in which the drill bit assembly can be held, the apparatus characterised by including a drill bit assembly storage unit having a plurality of holding means for holding a corresponding number of drill bit assemblies in an attitude for acceptance by chuck means positioned by the robot means, with respect to a selected drill bit assembly, and the holding means therefor, urging means for axially urging each holding means from a storage position to a position in which the drill bit assembly held thereby is presented to the chuck means, chuck engagement means on said unit for each of said holding means positioned to engage the relatively movable means to effect sequential opening and closing of the chuck means, and sequencing means responsive to the position of the chuck means relative to the selected holding means to effect urging of the drill bit assembly into the chuck means in correct sequence.

2. Apparatus according to claim 1 in which the relatively movable means for effecting a chuck open condition and a chuck closed condition comprise outer and inner sleeves relatively movable along said axis of rotation characterised in that the chuck engagement means comprises an abutment member carried by the storage unit which, when the chuck is moved toward the holding means, engages the outer sleeve but allows the inner sleeve to continue to move toward the holding means to open the chuck means to receive the drill bit assembly.

3. Apparatus according to claim 2 wherein the abutment member is in the form of annular bearing pad such that engagement by the outer sleeve can occur whilst chuck rotation is taking place.

4. Apparatus according to claim 3 wherein the holding means includes support means for allowing rotation of the drill bit assembly during holding by the holding means.

5. Apparatus according to claim 2 in which the sequencing means comprises first sensing means responsive to the open condition of the chuck means, second sensing means responsive to the presence of the drill bit assembly in the holding means, and valve means associated with said urging means responsive to signals from said first and second sensing means to actuate said urging means to urge the drill bit assembly toward the open chuck means.

6. Apparatus according to claim 5 in which the sequencing means further includes third sensing means responsive to the position of the holding means to cause said valve means associated with said urging means to actuate said urging means so as to move away from the chuck means only on closure of the chuck means.

7. Apparatus according to claim 6 in which the first, second, and third sensing means are arranged such that the urging means continues to urge the drill bit assembly into the chuck means, irrespective of movement of the chuck means by the robot, until the chuck means is closed.

* * * * *